US008381216B2

(12) United States Patent
Gowda

(10) Patent No.: US 8,381,216 B2
(45) Date of Patent: Feb. 19, 2013

(54) DYNAMIC THREAD POOL MANAGEMENT

(75) Inventor: Rohith Thammana Gowda, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/718,237

(22) Filed: Mar. 5, 2010

(65) Prior Publication Data

US 2011/0219377 A1 Sep. 8, 2011

(51) Int. Cl.
*G06F 9/46* (2006.01)
(52) U.S. Cl. ............ 718/102; 710/36; 711/169; 712/28; 712/29; 712/30; 712/31
(58) Field of Classification Search ........................ None
See application file for complete search history.

(56) References Cited

U.S. PATENT DOCUMENTS

| 5,752,031 | A | 5/1998 | Cutler et al. | |
|---|---|---|---|---|
| 7,249,355 | B2 | 7/2007 | O'Neill | |
| 2002/0078028 | A1* | 6/2002 | Lisanke | 707/1 |
| 2002/0194251 | A1 | 12/2002 | Richter et al. | |
| 2004/0194093 | A1* | 9/2004 | Koutharapu et al. | 718/100 |
| 2004/0210884 | A1* | 10/2004 | Raghavachari et al. | 717/158 |
| 2005/0081204 | A1* | 4/2005 | Schopp | 718/100 |
| 2007/0136311 | A1* | 6/2007 | Kasten et al. | 707/10 |
| 2009/0113440 | A1 | 4/2009 | Dorny | |

OTHER PUBLICATIONS

MSDN (Tuning .Net application performance, May 2004) http://msdn.microsoft.com/en-us/library/ff649152.aspx.*

Nagarajayya Nagendra, "SMP-Based, Multi-Threaded Server Architecture for Softswitch/Call Processing Domain", Retrieved at<< http://developers.sun.com/solaris/articles/smp.html>>,Jan. 2001, pp. 20.
Whitehead Nicholas, "Java Run-Time Monitoring, Part 3: Monitoring Performance and Availability of an Application's Ecosystem", Retrieved at << http://www.ibm.com/developerworks/linux/library/j-rtm3/index.html?ca=drs-&ca=dgf-ip>>, Aug. 12, 2008, pp. 71.
Meier, et al., "Chapter 17—Tuning .NET Application Performance", Retrieved at<< http://msdn.microsoft.com/en-us/library/ms998583.aspx>>, May 2004, pp. 39.
"Sun Java System Web Server 6.1 SP6 Performance Tuning, Sizing, and Scaling Guide", Retrieved at<< http://docs.sun.com/app/docs/doc/819-6516/6n8hbas97?a=view>>, Jan. 12, 2010, pp. 10.
"Chapter 10 Configuring the Server for Performance", Retrieved at<<http://www.santa-cruz.com/manual/ag/esperfrm.htm#1048673>>, Jan. 12, 2010, pp. 34.
"China Office Action", Application No. 201110060571.0, Mailed Date: Jul. 27, 2012, pp. 8.

* cited by examiner

*Primary Examiner* — Emerson Puente
*Assistant Examiner* — Sisley Kim

(57) ABSTRACT

Dynamically managing a thread pool associated with a plurality of sub-applications. A request for at least one of the sub-applications is received. A quantity of threads currently assigned to the at least one of the sub-applications is determined. The determined quantity of threads is compared to a predefined maximum thread threshold. A thread in the thread pool is assigned to handle the received request if the determined quantity of threads is not greater than the predefined maximum thread threshold. Embodiments enable control of the quantity of threads within the thread pool assigned to each of the sub-applications. Further embodiments manage the threads for the sub-applications based on latency of the sub-applications.

16 Claims, 4 Drawing Sheets

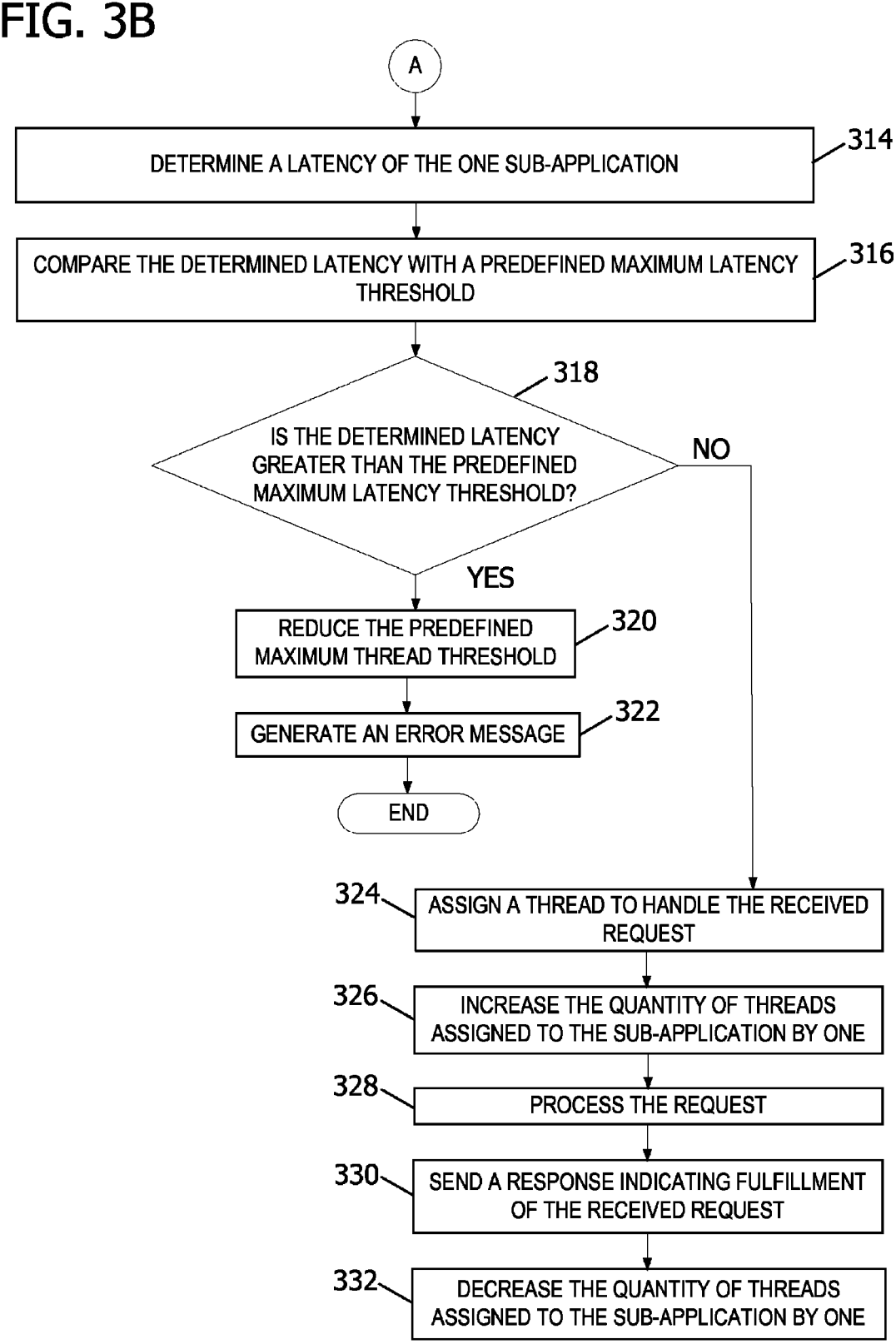

DYNAMIC THREAD POOL MANAGEMENT

BACKGROUND

A server is designed to provide services in response to requests from clients. A common approach to enable servers to process several requests concurrently is the use of thread pools that include a quantity of threads created to perform tasks. The quantity of threads in a thread pool is a resource, and typically, there are many more tasks than threads. If the quantity of threads in a thread pool is too low, there is less concurrency, potentially reducing overall request processing throughput. On the other hand, if the quantity of threads in a thread pool is too large, more time is wasted with context changes among threads and there is a greater chance of lock contention (e.g., threads with exclusive access to the same resources). A further result is a decrease of server throughput.

When an application utilizes a single thread pool to serve several associated sub-applications, all the sub-applications may experience a processing delay when just a few of the sub-applications are causing the delay. Further, when threads associated with a sub-application attempt to interact with a sub-application experiencing delay, these threads may be blocked until the delayed sub-application resolves. Performance of the application declines causing the user experience to degrade.

SUMMARY

Embodiments of the disclosure dynamically manage a thread pool associated with a plurality of sub-applications. Configuration information for an application and a plurality of sub-applications is received along with a request for at least one of the plurality of sub-applications. A quantity of threads currently assigned to the at least one of the sub-applications is determined and compared to a predefined maximum thread threshold for the sub-application from the configuration information. If the quantity of threads is not greater than the predefined maximum thread threshold, a thread in the thread pool is assigned to handle the request. However, if the quantity of threads is greater than the predefined maximum thread threshold, an error message is generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A and FIG. 3B are exemplary flow charts illustrating a process for dynamically managing a thread pool.

Corresponding reference characters indicate corresponding parts throughout the drawings bound.

DETAILED DESCRIPTION

Figure 1:
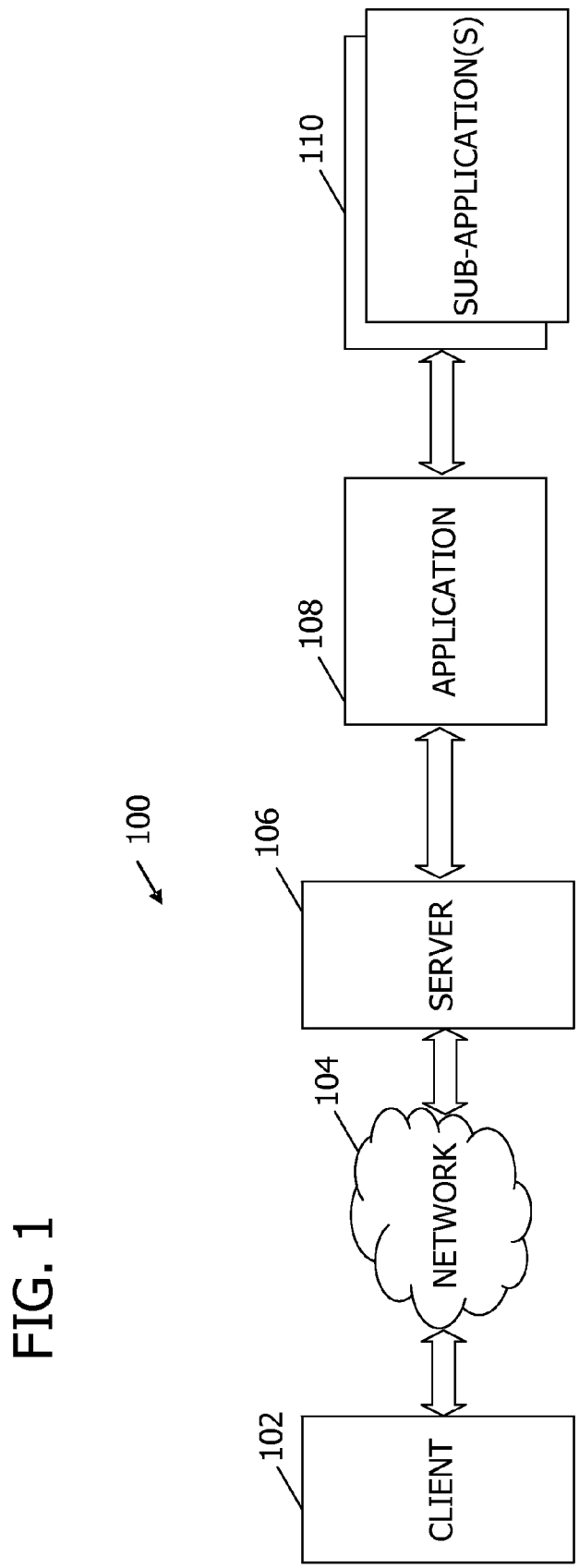
FIG. 1 is an exemplary block diagram illustrating a server receiving and processing a request from a client.

Referring to the figures, embodiments of the disclosure provide a system 100 for dynamically managing a thread pool 208 via a server 106 that serves an application 108 and a plurality of sub-applications 110. In some embodiments, a common language runtime thread pool serves a web site having a plurality of associated applications. Embodiments of the disclosure provide the server 106 an ability to dynamically change the number of threads in the thread pool 208 and to dynamically maintain the number of threads assigned to each of the sub-applications 110 based on the number of threads currently assigned to each of the sub-applications 110.

Further embodiments of the disclosure dynamically control the number of threads in the thread pool 208 based on a latency experienced by one or more of the sub-applications 110 (e.g., the number of threads in the thread pool 208 is inversely proportional to latency). This isolates the impact a latent sub-application may have on other sub-applications. More specifically, if a sub-application becomes latent, then until a response time of the latent sub-application is less than a predefined threshold, a maximum number of threads that can be assigned to the latent sub-applications is reduced to, for example, one. Requests bound for the latent sub-application then fail, which also provokes an error message to be sent back to the client 102. This fail mechanism prevents threads from being assigned to service a latent sub-application to contain the latency and enable more threads to be available for servicing requests bound for other sub-applications that are not latent. The latency may be associated with any component or operation of the sub-application such as a processing latency, network latency, or other latency.

Referring again to FIG. 1, an exemplary block diagram of the system 100 includes the client 102, a network 104, and the server 106. The client represents any computing device such as a mobile computing device, laptop, netbook, gaming console, or the like. The server 106 is configured to communicate with the client 102 via the network 104. The server 106 includes, or has access to, the application 108 and the sub-applications 110.

While some embodiments of the disclosure are illustrated and described herein with reference to the server 106 being a server computing device, aspects of the disclosure are operable with any device that performs the functionality illustrated and described herein, or its equivalent, such as in peer-to-peer systems. For example, embodiments of the disclosure are operable with netbooks, desktop computing devices, laptop computers, and other computing devices. In such embodiments, data may be stored by a cloud service and accessible by any computing device implementing functionality of the disclosure.

Figure 2:
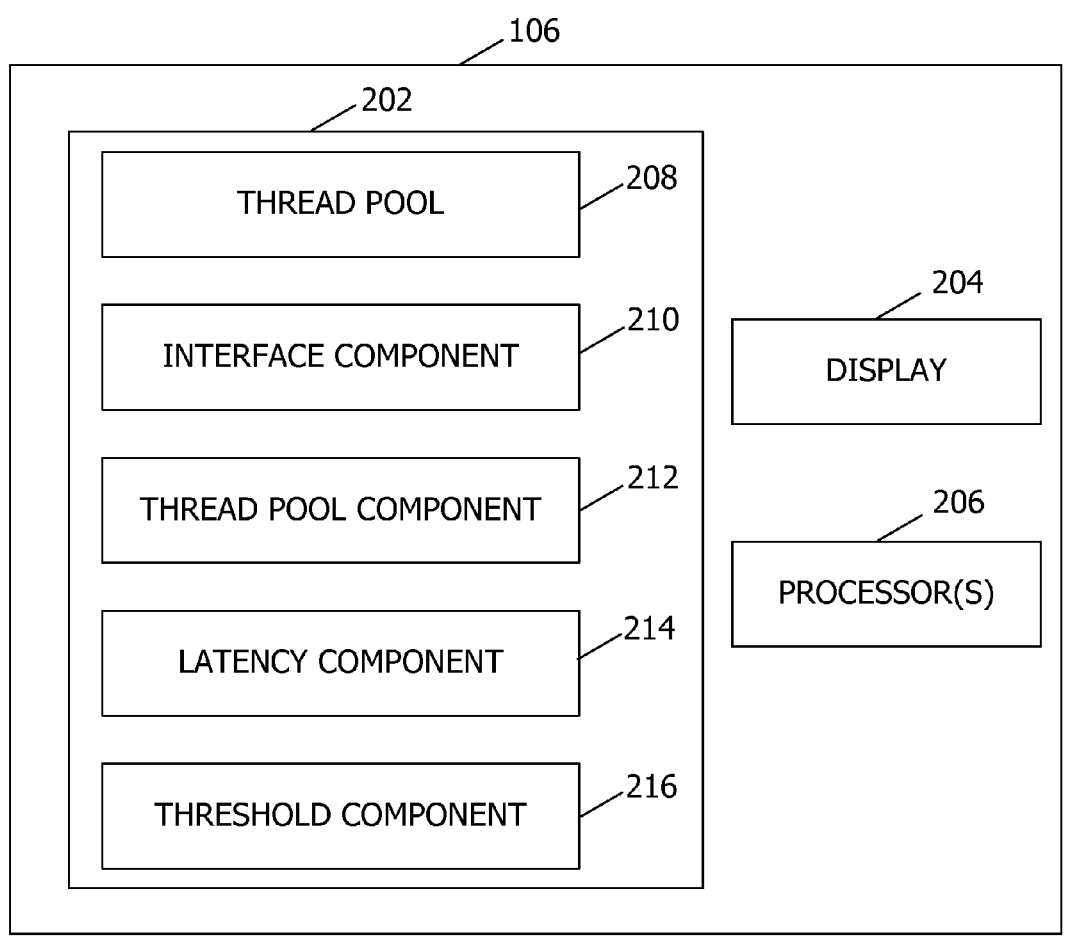
FIG. 2 is an exemplary block diagram of a server having a memory area storing components for dynamically managing a thread pool.

Referring next to FIG. 2, the server 106 has a memory area 202 for storing components for dynamically managing the thread pool 208. The server 106 further includes a display 204 and at least one processor 206. The display 204 may be, for example, a capacitive touch screen display that is integrated into the server 106 or external to the server 106. User input functionality is provided in the display 204 which acts as a user input selection device. The display 204 is configured to be responsive to a user pressing contact on the display 204 to selectively perform functionality. Thus, a user can input, for example, maximum thresholds by contacting a surface of the display 204 as well as other functions provided herein.

Memory area 202 stores the thread pool 208 and one or more computer-executable components. Exemplary components include, but are not limited to an interface component 210, a thread pool component 212, a latency component 214, and a threshold component 216. While the thread pool 208 and components 210, 212, 214, 216 are shown to be stored in memory area 202, the thread pool 208 and components 210, 212, 214, 216 may be stored and executed from a memory area remote from the server 106. For example, the thread pool

208 may be stored in a cloud service, a database, or other memory area accessible by the server 106. Such embodiments reduce the computational and storage burden on the server 106.

Processor 206 executes computer-executable instructions for implementing aspects of the disclosure. In some embodiments, the processor 206 is transformed into a special purpose microprocessor by executing computer-executable instructions or by otherwise being programmed. For example, the processor 206 may execute the interface component 210, the thread pool component 212, the latency component 214, and the threshold component 216. The interface component 210, when executed by the processor 206, causes the processor 206 to receive configuration information of the application 108 and the sub-applications 110, as well as receive a request from the client 102 for at least one of the sub-applications 110. The configuration information includes, for example, the predefined maximum thread threshold, and optionally the predefined maximum latency threshold, for each of the sub-applications. The configuration information may be set by a developer associated with the application 108, the user, or another entity.

The thread pool component 212, when executed by the processor 206, causes the processor 206 to determine a quantity of threads currently assigned to the at least one of the sub-applications, determine if the quantity of threads currently assigned to the at least one of the sub-applications is not greater than the predefined maximum thread threshold, and assign a thread to handle the received request if the quantity of threads currently assigned to the at least one of the sub-applications 110 is not greater than the predefined maximum thread threshold. The latency component 214, when executed by the processor 206, causes the processor 206 to determine a latency of the at least one of the sub-applications 110. The interface component 210, when executed by the processor 206, further causes the processor 206 to send an error message to the client 102 if the determined latency is greater than the predefined maximum latency threshold. For example, the error message may include a "retry after xxx seconds" suggestion. The threshold component 216, when executed by the processor 206, causes the processor 206 to reduce the predefined maximum thread threshold to, for example, one, if the determined latency is greater than a predefined maximum latency threshold. Further, the threshold component 216, when executed by the processor 206, causes the processor 206 to increase the predefined maximum thread threshold if the determined latency is not greater than a predefined maximum latency threshold and if the current predefined maximum thread threshold is one.

Figure 3A:
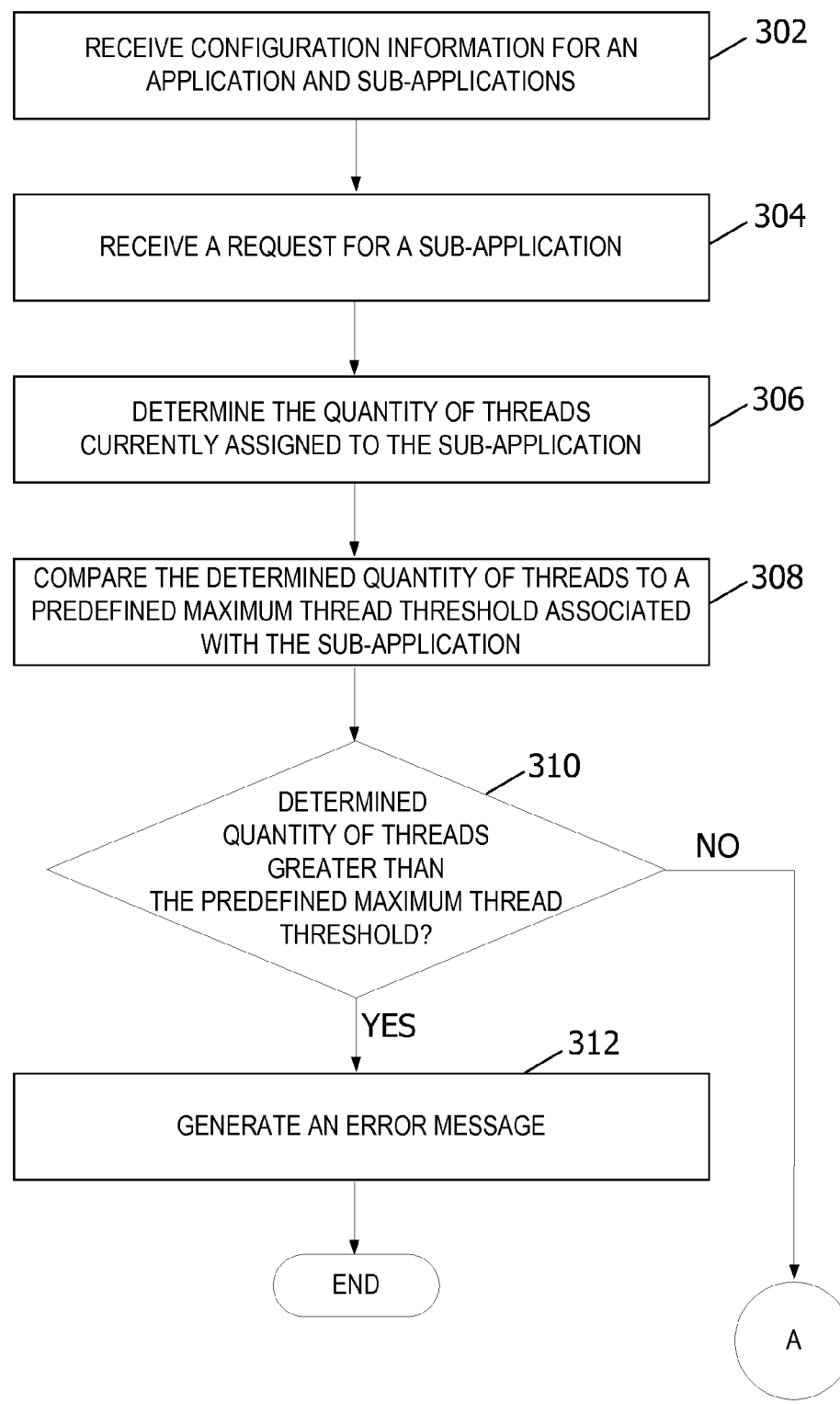

In general, the processor 206 may be programmed with instructions such as described herein with reference to the components illustrated in FIG. 2, and the operations illustrated and next described in FIG. 3A and FIG. 3B.

Referring next to FIG. 3A and FIG. 3B, an exemplary flow chart illustrates a process for dynamically managing a single thread pool (e.g., the thread pool 208) associated with the application 108 and the sub-applications 110. Upon a start-up of the application 108, at 302, configuration information of the application 108 and the sub-applications 110 are received. In an alternative embodiment, configuration information of the application 108 and the sub-applications 110 are stored in memory area 202, and upon a start-up of the application 108, the stored configuration information may be compared to the received configuration information, and, if needed, updated based on the comparing. In one embodiment, configuration information includes a predefined maximum thread threshold associated with one or more of the sub-applications 110. The predefined maximum thread threshold may be different among each of the sub-applications 110. For example, the predefined maximum thread threshold may be based on an amount of "traffic" each of the sub-applications receives, and thus may vary in size from one sub-application to another. Thus, a sub-application with a lower level of traffic when compared to other sub-applications in the sub-applications 110 may have a predefined maximum thread threshold that is lower than the other sub-applications in the sub-applications 110, and vice versa. In a further embodiment, the configuration information may also include a predefined maximum latency threshold associated with one or more of the sub-applications 110.

At 304, a request for at least one of the sub-applications 110 (e.g., a target sub-application) is received from the client 102. Upon receiving the request, the quantity of threads currently assigned to the target sub-application is determined at 306. At 308, the determined quantity of threads is compared to a predefined maximum thread threshold associated with the target sub-application. The predefined maximum threshold associated with the target sub-application being stored within the received/stored configuration information. At 310, it is determined whether the determined quantity of threads assigned to the target sub-application is greater than the predefined maximum thread threshold. At 312, an error message is generated and sent to the client 102 if the determined quantity of threads assigned to the target sub-application is greater than the predefined maximum thread threshold associated with the target sub-application.

At 314, if the determined quantity of threads assigned to the target sub-application is not greater than the predefined maximum thread threshold, the latency of the target sub-applications is determined. In one embodiment, a latency is determined by calculating, over a predefined period of time (e.g., one minute, five minutes, ten minutes), an average response time for the target sub-application to process a request. In a further embodiment, a latency may not be determined until the target sub-application processes a predefined number of requests. For example, a latency may not be determined until the target sub-application processes ten requests, fifty requests, or even several hundred requests. Thus, in this example, once the target sub-application processes the predefined number of requests, an average response time for processing each of the predefined number of requests is determined. In one embodiment, the predefined number of requests may be stored within the received/stored configuration information.

At 316, the latency of the target sub-application is compared with a predefined maximum latency threshold associated with the target sub-application. At 318, it is determined whether the determined latency of the at least sub-application is greater than the predefined maximum latency threshold associated with the target sub-application. At 320, an error message is generated and sent to the client 102 if the determined latency of the at least sub-application is greater than the predefined maximum latency threshold associated with the target sub-application. At 322, if the determined latency of the at least sub-application is greater than the predefined maximum latency threshold associated with the target sub-application, the predefined maximum thread threshold is reduced to a value greater than zero but close to one. The maximum thread threshold is reduced to a non-zero value to dynamically detect when a latent sub-application is no longer latent. Setting the maximum thread threshold for a latent sub-application too high causes threads to block and could lead to thread starvation for other sub-applications. In one embodiment, if the determined latency of the at least sub-application is greater than the predefined maximum latency threshold associated with the target sub-application, the predefined maximum thread threshold is reduced to one. Dynamically controlling the number of threads that can be assigned to the target sub-application (e.g., reducing the number of threads that can be assigned to one thread) isolates an impact the target sub-application may have on each of the other sub-applications in the sub-applications 110. Therefore, any request that is received from, for example, the client 102 that is bound for the target sub-application fails. Allowing each received request to fail prevents threads from being assigned to the target sub-application and enables more threads to be available for servicing requests bound for all of the other sub-applications in the sub-applications 110.

After the predefined maximum threshold associated with the target sub-application is reduced, latency for the at least one sub-application may not be determined until either a predefined period of time has passed or a predefined number of requests are processed by the target sub-application. In one embodiment, the predefined period of time or the predefined number of processed requests is reduced when the target sub-application is determined to be latent. Thus, in this example, when the target sub-application is determine to be latent, the predefined period of time or the predefined number of process requests is lower than when the target sub-application is determined to be non-latent. Once the predefined period of time has passed or the predefined number of requests has been processed, an average response time for processing a request during the predefined period of time is determined or an average response time for processing each of the predefined number of requests is determined. After it is determined that the average response time for processing a request is not greater than the predefined maximum latency threshold associated with the target sub-application, the reduced predefined maximum thread threshold is increased to, for example, the predefined maximum thread threshold of the target sub-application prior to the reduced predefined maximum thread threshold.

At 324, if the determined quantity of threads assigned to the target sub-application is not greater than the predefined maximum thread threshold associated with the at least on sub-application and if the determined latency of the target sub-application is not greater than the predefined maximum latency threshold associated with the at least on sub-application, a thread from the thread pool 208 is assigned to handle the received request. At 326, the quantity of threads assigned to the target sub-application is increased by one upon assigning the thread to handle the received request. At 328, the received request is processed and at 330, a response fulfilling the received request is sent to the client 102. At 332, upon sending the response to the client fulfilling the received request, the quantity of threads assigned to the target sub-application is decreased by one.

While some embodiments of the disclosure contemplate execution of the operations illustrated in FIG. 3A and FIG. 3B by the server 106, the client 102 may execute one or more of the operations in some embodiments.

Exemplary Operating Environment

A computer or computing device such as the server 106 and the client 102 described herein have one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for dynamically maintaining a plurality of threads for the plurality of sub-applications in one thread pool based on thread count and latency, and exemplary means for dynamically maintaining a quantity of threads assigned to each of a plurality of sub-applications.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for dynamically managing a thread pool associated with a plurality of sub-applications, said system comprising:
    a memory area for storing configuration information of an application having a plurality of sub-applications associated therewith, said configuration information including a predefined maximum thread threshold associated with one or more of the plurality of sub-applications, said configuration information further including a predefined maximum latency threshold associated with one or more of the plurality of sub-applications, said application and said plurality of sub-applications being associated with one thread pool; and
    a processor programmed to:
    receive the configuration information of said application and said plurality of sub-applications upon a start-up of said application;
    receive a request for at least one of the sub-applications;
    determine a quantity of threads currently assigned to said at least one of the sub-applications;
    compare the determined quantity of threads with the predefined maximum thread threshold stored in the memory area to generate a first comparison result;
    determine a latency of said at least one of the sub-applications;
    compare the determined latency with said predefined maximum latency threshold stored in said memory area to generate a second comparison result;
    assign a thread in said one thread pool to handle the received request based on said first comparison result and said second comparison result; and
    reduce the predefined maximum latency threshold stored in said memory area to a quantity of one if the determined latency is greater than the predefined maximum latency threshold.

2. The system of claim 1, wherein the processor is programmed to receive the request from a client, and wherein said processor is further programmed to send an error message to the client if the determined quantity of threads is greater than said predefined maximum thread threshold.

3. The system of claim 1, wherein said processor is further programmed to calculate, over a predefined period of time, an average response time for said at least one of the sub-applications to process a request.

4. The system of claim 1, further comprising means for dynamically maintaining a plurality of threads for the plurality of sub-applications in said one thread pool based on thread count and latency.

5. The system of claim 1, further comprising means for dynamically maintaining a quantity of threads assigned to each of said plurality of sub-applications.

6. A method comprising:
    receiving configuration information of an application having a plurality of sub-applications associated therewith, the sub-applications being associated with one thread pool, the configuration information including a predefined maximum latency threshold;
    receiving a request for at least one of the sub-applications;
    determining a quantity of threads currently assigned to the at least one of the sub-applications;
    comparing the determined quantity of threads to a predefined maximum thread threshold from the received configuration information;
    assigning a thread in the one thread pool to handle the received request if the determined quantity of threads is not greater than the predefined maximum thread threshold;
    generating an error message if the determined quantity of threads is greater than the predefined maximum thread threshold;
    determining a latency of the at least one of the sub-applications;
    comparing the determined latency of the at least one of the sub-applications with the predefined maximum latency threshold; and
    reducing the predefined maximum thread threshold to a quantity of one if the determined latency is greater than the predefined maximum latency threshold.

7. The method of claim 6, further comprising increasing the quantity of threads assigned to the at least one of the sub-applications after assigning the thread to handle the received request.

8. The method of claim 6, wherein receiving the request comprises receiving the request from a client, and further comprising sending an error message to the client if the determined latency is greater than the predefined maximum latency threshold.

9. The method of claim 6, wherein receiving the request comprises receiving the request from a client, wherein the assigned thread processes the received request, and further comprising sending to the client a response indicating fulfillment of the received request.

10. The method of claim 9, further comprising decreasing the quantity of threads assigned to the at least one of the sub-applications by one after sending the response to the client.

11. The method of claim 6, wherein determining a latency of the at least one of the sub-applications comprises calculating, over a predefined period of time, an average response time for the at least one of the plurality of sub-applications to process a request.

12. The method of claim 6, wherein determining a latency of the at least one of the sub-applications comprises calculating an average response time for the at least one of the sub-applications to process a predefined quantity of requests.

13. One or more computer storage media storing computer-executable components, said components comprising:
    an interface component that when executed by at least one processor causes the at least one processor to receive configuration information of an application having a plurality of sub-applications, and further to receive a request for at least one of the sub-applications, the plurality of sub-applications being associated with the application, the configuration information including a predefined maximum latency threshold;

a thread pool component that when executed by at least one processor causes the at least one processor to assign a thread to handle the request received by the interface component based on a comparison of the quantity of threads currently assigned to the at least one of the sub-applications and a predefined maximum thread threshold;

a latency component that when executed by at least one processor causes the at least one processor to determine a latency of the at least one of the sub-applications; and a threshold component that when executed by at least one processor causes the at least one processor to compare the determined latency of the at least one of the sub-applications with the predefined maximum latency threshold, and to change the predefined maximum thread threshold based on the latency determined by the latency component, changing the predefined maximum thread threshold includes reducing the predefined maximum thread threshold to a quantity of one if the latency determined by the latency component is greater than the predefined maximum latency threshold.

14. The computer storage media of claim 13, wherein execution of the thread pool component by the at least one processor further causes the at least one processor to:
   determine a quantity of threads currently assigned to the at least one of the sub-applications; and
   determine if the quantity of threads currently assigned to the at least one of the sub-applications is not greater than the predefined maximum thread threshold.

15. The computer storage media of claim 13 wherein execution of the interface component by the at least one processor further causes the at least one processor to generate an error message if the latency determined by the latency component is greater than a predefined maximum latency threshold.

16. The computer storage media of claim 13, wherein execution of the threshold component by the at least one processor further causes the at least one processor to increase the predefined maximum thread threshold if the latency determined by the latency component is not greater than the predefined maximum latency threshold and if a current predefined maximum thread threshold has a value of one.

* * * * *

UNITED STATES PATENT AND TRADEMARK OFFICE
CERTIFICATE OF CORRECTION

PATENT NO. : 8,381,216 B2  
APPLICATION NO. : 12/718237  
DATED : February 19, 2013  
INVENTOR(S) : Rohith Thammana Gowda Page 1 of 1

It is certified that error appears in the above-identified patent and that said Letters Patent is hereby corrected as shown below:

In the Claims

In column 7, line 55, in Claim 1, delete "latency threshold" and insert -- thread threshold --, therefor.

Signed and Sealed this  
Fourteenth Day of May, 2013

Teresa Stanek Rea  
*Acting Director of the United States Patent and Trademark Office*